United States Patent
Bruns

[11] Patent Number: 5,925,832
[45] Date of Patent: Jul. 20, 1999

[54] TORSIONAL SENSING LOAD CELL

[75] Inventor: Robert W. Bruns, Sacramento, Calif.

[73] Assignee: GageTek Company, Rancho Cordova, Calif.

[21] Appl. No.: 08/942,314

[22] Filed: Oct. 1, 1997

[51] Int. Cl.$^6$ ................................................. G01L 3/02
[52] U.S. Cl. ........................... 73/862.635; 73/862.632; 73/862.641
[58] Field of Search ...................... 73/862.632, 862.635, 73/862.641; 177/225

[56] References Cited

U.S. PATENT DOCUMENTS

| | | | |
|---|---|---|---|
| 42,801 | 5/1864 | Sleppy . | |
| 2,087,354 | 7/1937 | Muffly | 177/273 |
| 2,582,886 | 1/1952 | Ruge | 73/862.635 |
| 2,673,464 | 3/1954 | Züblin | 73/141 |
| 3,736,795 | 6/1973 | Andersson | 73/862.632 |
| 3,842,667 | 10/1974 | Alexander et al. | 73/141 |
| 3,969,935 | 7/1976 | Shoberg | 73/862.635 |
| 4,090,399 | 5/1978 | Babcock | 73/88 F |
| 4,386,386 | 5/1983 | Akita | 361/283 |
| 4,840,521 | 6/1989 | Bonnet | 411/14 |
| 5,220,971 | 6/1993 | Farr | 177/229 |
| 5,461,933 | 10/1995 | Ives et al. | 73/862.623 |
| 5,591,943 | 1/1997 | Cheng | 73/862.632 |
| 5,714,695 | 2/1998 | Bruns | 73/862.641 |

OTHER PUBLICATIONS

LaVar Clegg, "Bonded Foil Strain Gauge Force Tranducers", *Sensors,* pp. 68–75 (Oct. 1996).
Product brochure for "Compression Only / Thru Load Washer".

*Primary Examiner*—Elizabeth L. Dougherty
*Attorney, Agent, or Firm*—Thomas Schneck; George B.F. Yee

[57] ABSTRACT

A torsional sensing load cell comprises a load sensing member having first and second deflecting portions. Force-receiving areas are defined on upper and lower surfaces of the deflecting portions for bearing a load and its corresponding reactive force. This imposes a torque on the load sensing member which is detected by transducers positioned to detect torsional stress. The transducers are coupled in a bridge circuit and are placed such that the output signal of the circuit is insensitive to the location of an applied load.

40 Claims, 7 Drawing Sheets

TORSIONAL SENSING LOAD CELL

TECHNICAL FIELD OF THE INVENTION

The present invention relates to load cells and more specifically to an apparatus and method for a torsional sensing load cell.

BACKGROUND ART

Load cells are used to provide accurate measurements of compressive or tensile forces. Typically, the force creates a strain in the load cell which is measured by strain gage transducers. Accurate measurements, however, require that the force be applied along the same axis as the transducers. An off-axis force has a perpendicular force component, resulting in bending and/or shear loads which would be sensed by the transducers and be mistakenly taken as part of the axial load.

An example of such a load cell which is sensitive to the effects of off-axis loading is known as a compression washer. U.S. Pat. No. 4,212,360 discloses such a load cell (FIGS. 4a and 4b), an example of which is shown in a product brochure entitled "Compression Only/Thru Hole Load Washer". As the name implies, this type of load cell is configured as a washer so that it can be mounted by securing a bolt through the device.

Other compressive load cells which are less sensitive to off-axis loading are characterized by several types. One such load cell employs a shear web design disclosed in U.S. Pat. No. 5,461,933. This design consists of a pair of concentric rings joined by two or more web members. Transducer elements disposed on the webs provide compression and tension force measurements. Although this design reduces sensitivity to off-axis loads, the web assembly must be accurately machined to tight tolerances. In addition, the transducers must be carefully bonded to the walls of the webs in a symmetrical manner in order to ensure accuracy in the measurements.

A ball and socket assembly design serves to maintain the loading force along the principle axis and exactly centered on the load cell. Such a design is shown in Photo 2 in the article by Clegg entitled "Bonded Foil Strain Gauge Force Transducers", *Sensors,* October 1996, pp. 68–75. As can be seen from the photograph, the manufacture of such a device can be quite expensive.

A shear beam load cell, such as the one disclosed in U.S. Pat. No. 5,220,971, can also be used in tension and compression applications. The transducer elements are diagonally placed on a machined web in the center portion of the device and measure the shear force of the applied load. Such devices are expensive to machine and accurate measurements depend on consistently centered and axially constrained forces. A similar load cell is disclosed U.S. Pat. No. 3,376,795 comprising an annularly shaped shear-beam load cell wherein the force-measuring transducers are located in webs formed into the body of the load cell.

What is needed is an easy to manufacture load cell which can deliver accurate measurements and which is insensitive to the forces present under off-axis loading conditions. It is also desirous to construct a load cell having the above characteristics, yet is compact in size and has low manufacturing costs.

SUMMARY OF THE INVENTION

A torsional sensing load cell in accordance with the present invention comprises an active load sensing member having first and second deflecting arms. A portion of each deflecting arm receives the force resulting from an applied load. Upper and lower loading surfaces are coupled to the force-receiving portions so that the force of an applied load and its corresponding reactive force are directed only to the force-receiving portions of the deflecting arms. A pair of transducers are mounted on the load sensing member to sense torsional stresses resulting from the applied load.

In a preferred embodiment of the invention, the load sensing element is a curved member having a longitudinal gap. Various cross sectional shapes are possible; for example, the curved member may have a cylindrical shape, a rectangular shape, and so on. The open area formed within the curvature, likewise, may take on any shape. Thus in the preferred embodiment, the load sensing member is a cylinder having a gap formed along its longitudinal length and having a cylindrical opening therethrough.

The loading surfaces serve as means for mounting the load cell to receive a load. As such, the loading surfaces may be solid members having threaded openings for mounting purposes. Alternatively, the loading surfaces may be hollowed out so that the load cell can be mounted by passing a mounting bolt through the entire structure of the load cell.

In the preferred embodiment, each of the two transducers comprises two sets of strain elements arranged in a chevron pattern, one set being disposed ninety degrees relative to the other. The two sets of strain elements comprising each transducer are mounted to the load sensing member on a forty-five degree angle relative to a neutral axis of the load sensing member. In a variation of the preferred embodiment, each transducer may comprise only one such set of strain elements.

BRIEF DESCRIPTION OF THE DRAWINGS

FIGS. 9A–9F are top views of the load cell of FIG. 8 shown along the view line 9—9, illustrating alternate profiles of the active load sensing portion of the load cell.

BEST MODE FOR CARRYING OUT THE INVENTION

Figure 1:
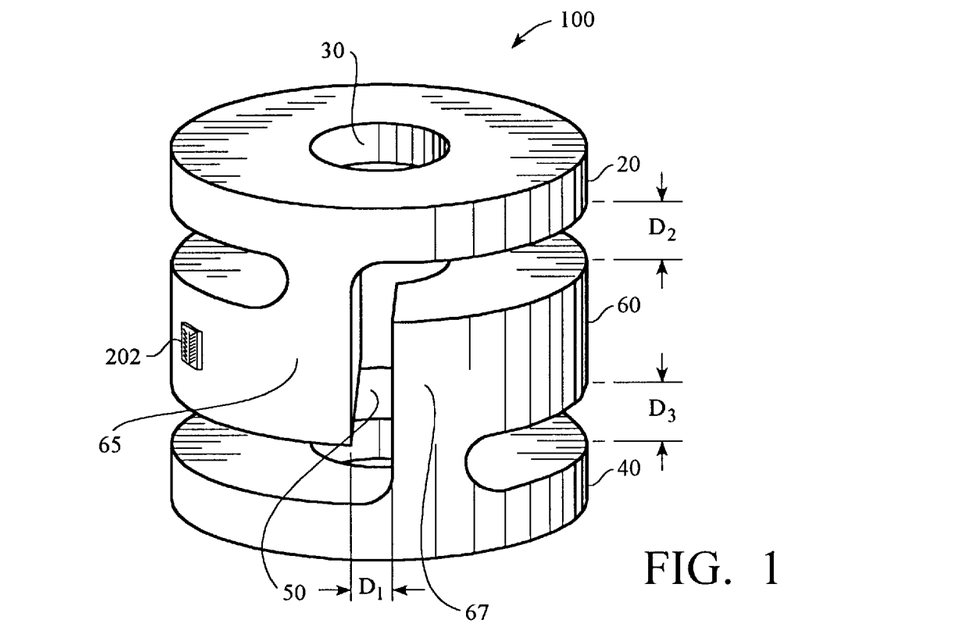
FIG. 1 is a perspective view of a load cell according to the present invention.
Figure 2:
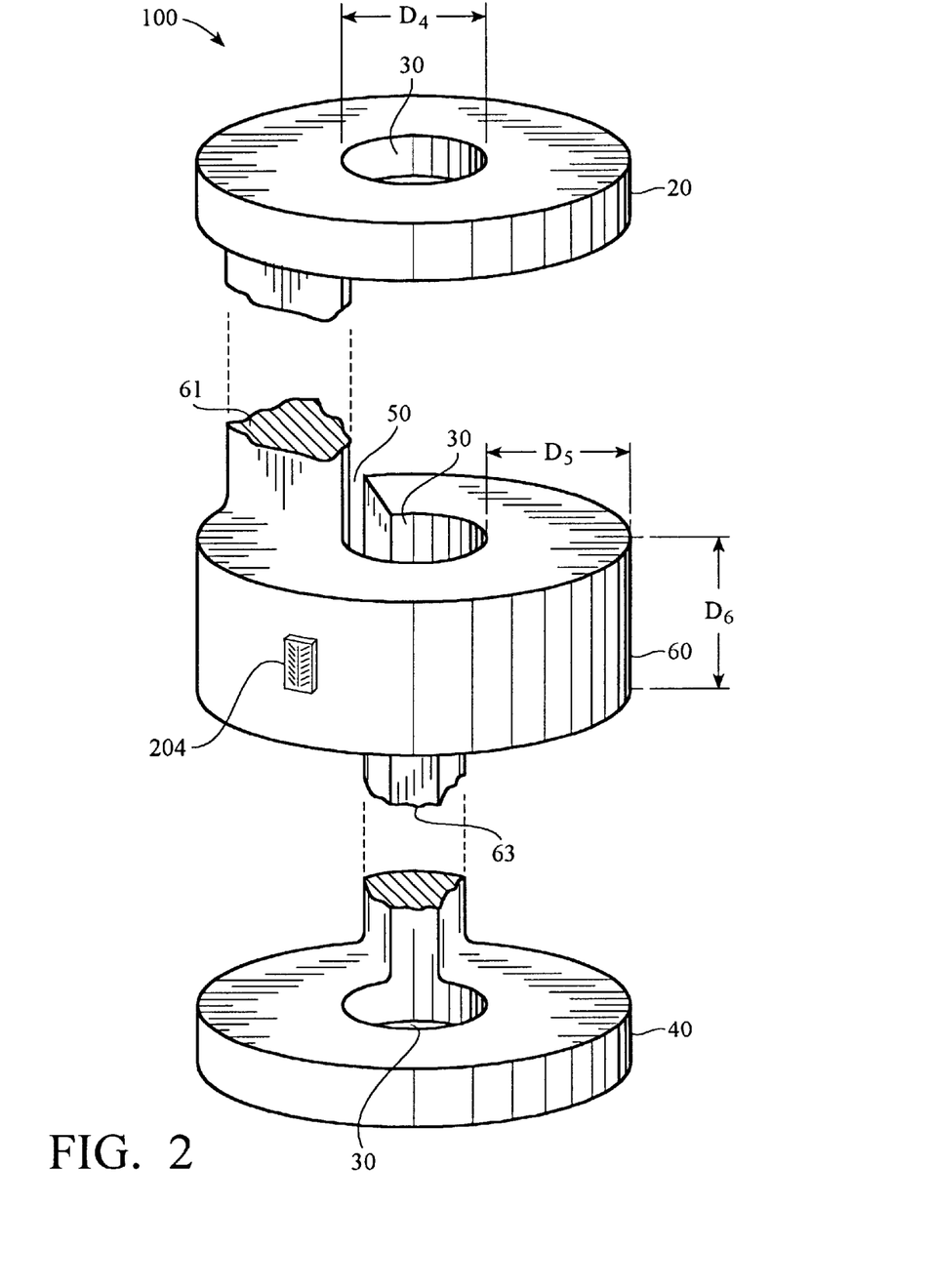
FIG. 2 is an exploded view of the load cell shown in FIG. 1.

With reference to FIGS. 1 and 2, a load cell 100 comprises a central load sensing body 60 which is a cylindrical member. Transducers 202, 204 are mounted to the central body, and as will be discussed in greater detail the transducers are positioned about the central body 60 in diametrically opposed relation. Such placement of the transducers is indicated in FIG. 1, showing transducer 202, and in the exploded/rotated view of the load cell shown in FIG. 2.

The cylindrical central body 60 is further characterized by having a gap or slotted opening 50 formed through the thickness of the cylindrical member, thus forming a "split" in the cylinder. Splitting the cylinder in this manner results in the cylinder having two deflectable arms 65, 67.

The load cell 100 further comprises upper and lower loading members 20, 40 which serve as the load bearing surfaces. Loading members 20, 40 are coupled to the central body 60 at force-receiving portions 61, 63 of the deflectable arms as shown in FIG. 2. Specifically, upper load bearing member 20 is coupled to force-receiving portion 61 located on a portion of the upper surface of central body 60. Similarly, lower loading member 40 is coupled to force-receiving portion 63 located on a portion of the bottom surface of central body 60. The central body 60 is thereby said to be "suspended" at portions 61, 63.

The preferred embodiment of the load cell 100 further includes a through hole 30 formed through each of the upper and bottom loading surfaces 20, 40, forming upper and lower ring-shaped load-bearing members. The openings provide a means for mounting the load cell to the mounting surface of a load producing structure, in this case by passing a mounting bolt through the cell. Note that the particular structure of the loading surfaces 20, 40 is not relevant to the practice of the invention beyond providing a means for mounting the load cell. Thus, the loading surfaces 20, 40 may be solid members with mounting holes drilled and tapped thereinto for mounting, instead of having through holes 30 as shown. Or, the load cell may be attached by welding or gluing the loading surfaces to an appropriate load producing structure.

Figure 3:
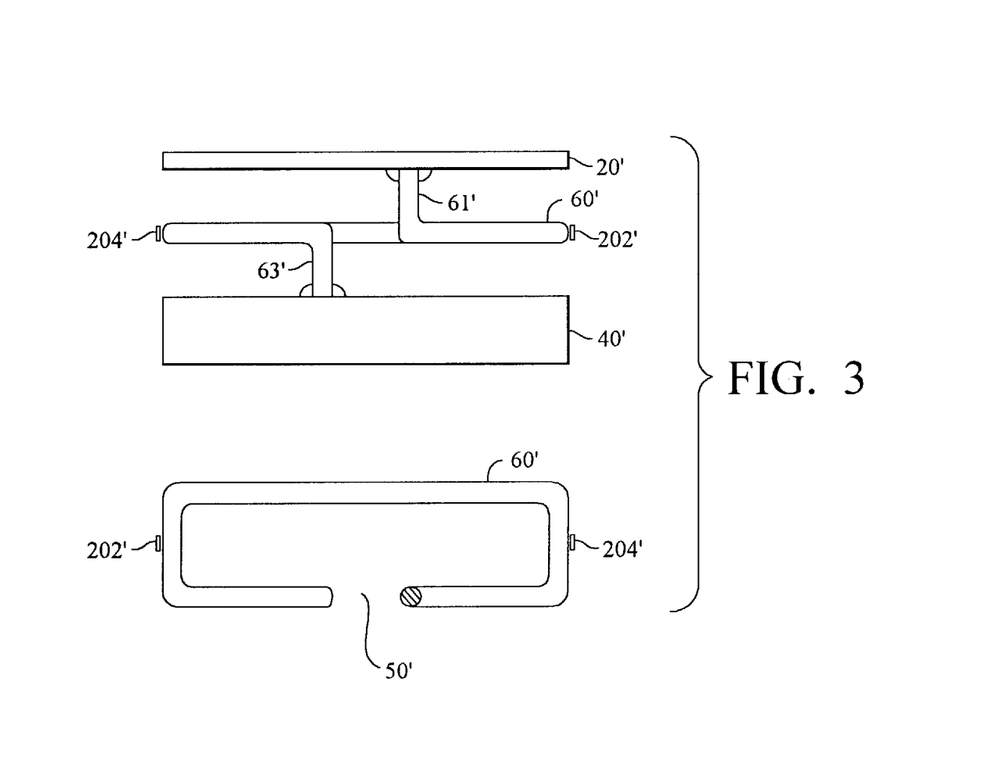
FIG. 3 shows a low capacity load cell.

The embodiment depicted in FIGS. 1 and 2 show the loading surfaces 20, 40 and the central body 60 as a single element, such as might result from being cast in a mold. Being able to form the load cell in a single casting step greatly reduces the cost of manufacture. This is not necessary to the practice of the invention, however. In an alternative embodiment, the load cell can be assembled from separate elements. For example, FIG. 3 shows a load cell 100' which comprises a weighing plate 20' spot welded to a load sensing element 60', which in turn is spot welded to a base member 40'. The load sensing element 60' can be a loop of wire formed as shown in FIG. 3 for use in a low capacity application such as a postal scale or a gram scale. The gap 50' in the loop of wire corresponds to the split 50 of the central load sensing body 60 of the cylindrical embodiment shown in FIGS. 1 and 2.

Continuing with FIGS. 1 and 2, under static conditions the force of a load applied to one loading surface, say loading surface 20, will produce an opposing reactive force on loading surface 40. Recall that the loading surfaces direct the forces to force-receiving portions 61, 63 of the central load sensing body 60. Since the central body is split, these forces produce a torsional stress which is sensed by the transducers 202, 204. Moreover, since the central body is suspended (i.e. supported) only at the force-receiving portions 61, 63, the torsional stress is transmitted through the central body from one end to the other. This is shown more clearly in FIG. 3 where the central load sensing element 60' can be seen to be supported only at two points 61', 63'. This is an important aspect of the invention because such an arrangement of the sensing member subjects both of the transducers to the same torsional stress. If, on the other hand, the central body 60 included an additional supporting member interposed between the force-receiving surfaces 61, 63, each transducer would be subject to different, independent torsional stresses. However, as will become clear in the discussion below, it is necessary in the present invention that both transducers detect the same torsional stress in the central body arising from the same torsion-producing forces. An inspection of the embodiment of FIG. 3 shows that a similar torsional stress arises in the central load sensing element 60' where transducers 202', 204' are subject to the same torsional stress by virtue of the load sensing element being supported only at force-receiving portions 61', 63'.

Figures 4A, 4B:
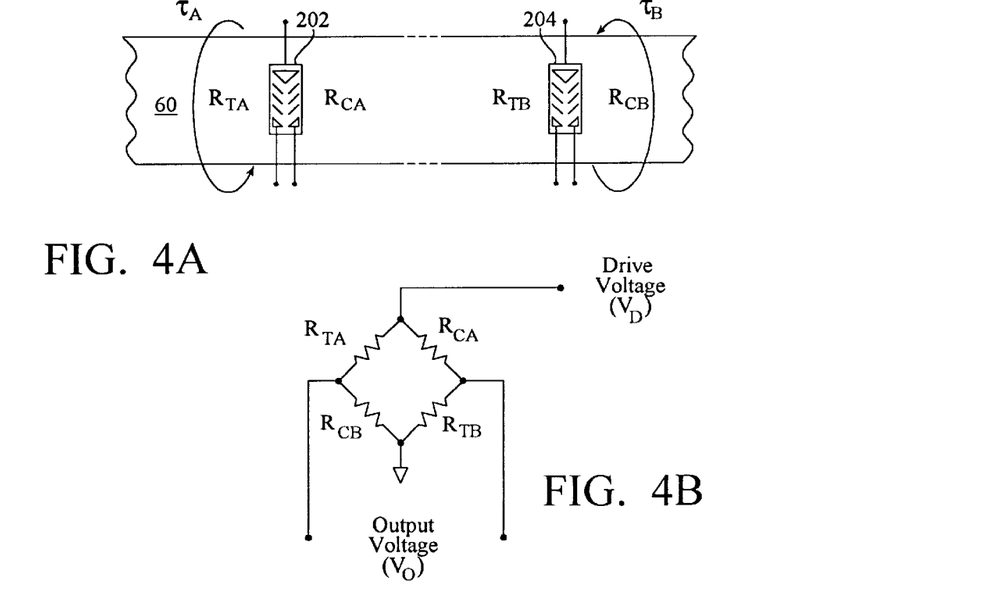
FIGS. 4A–4B, 5A–5C are schematic diagrams of the bridge circuitry coupling the transducers used in the present invention.

In FIG. 4A, transducers 202, 204 each comprises two sets of strain elements $R_T$, $R_C$ arranged in a ninety degree chevron pattern, which is a standard configuration for strain gauges used to measure strain on the surface of a member under torsional load, and are mounted relative to a neutral axis of the sensing member. In the presence of a torsional stress, each transducer 202, 204 will be subject to a stress $\tau_A$, $\tau_B$ respectively, such as shown in FIG. 4A. The actual direction of the stresses will vary depending on the position of the load with respect to locations A and B. For any loading situation, however, one set of strain elements of transducer 202 (e.g. $R_{TA}$) will be in tension when the other set of strain elements (e.g. $R_{CA}$) is in compression. The strain elements $R_{TB}$, $R_{CB}$ comprising transducer 204 are similarly stressed. The strain elements of both transducers are coupled in a Wheatstone bridge, such as shown in FIG. 4B, where similarly strained elements are located on opposite legs of the bridge. The differential output signal $V_o$ is characterized by $$V_O = V_D \left( \frac{R_{CB}}{R_{TA} + R_{CB}} - \frac{R_{TB}}{R_{CA} + R_{TB}} \right) \qquad \text{Eqn. 1}$$

However, since $R_{CB}$ and $R_{TB}$ are oppositely strained, the difference signal actually represents a summation of the torsional stresses sensed at both transducers 202, 204, namely $\tau_A + \tau_B$.

Figure 5A:
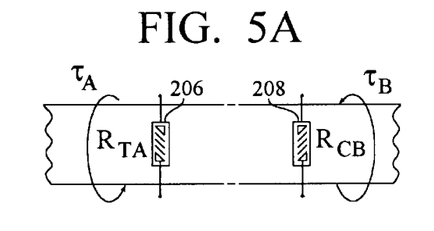
Figure 5B:
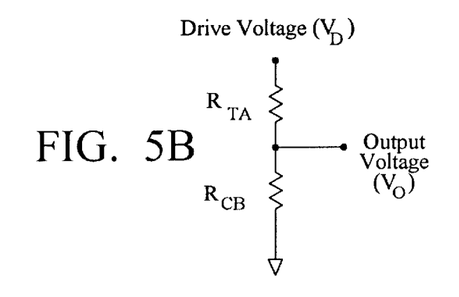

FIG. 5A shows an embodiment using transducers 206, 208 which have a simpler construction. Here, each transducer 206, 208 comprises only a single set of strain elements. FIG. 5B shows a voltage divider circuit used for such transducers. In this case, the output signal is defined by the voltage divider equation which characterizes the circuit. Unlike the bridge circuit of FIG. 4B, the circuit of FIG. 5B provides an output signal that is proportional to the torsional stress experienced by a single transducer, namely $$V_O = V_D \left( \frac{R_{CB}}{R_{TA} + R_{CB}} \right) \qquad \text{Eqn. 2}$$

Figure 5C:
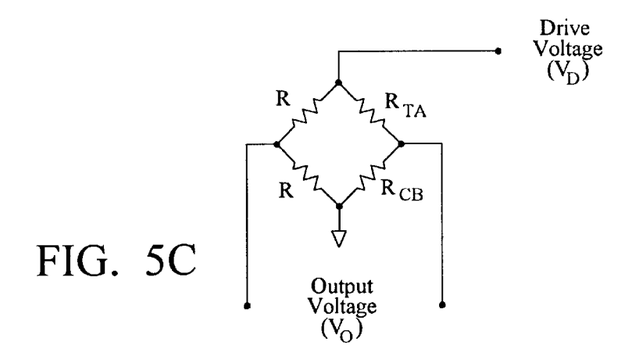

This embodiment produces a smaller output signal than the embodiment of FIG. 4A. However, a differential signal can be generated by using the circuit of FIG. 5C which comprises a pair of fixed resistances R used in conjunction with $R_{TA}$ and $R_{CB}$ in a bridge configuration. The equation which characterizes this circuit is $$V_O = V_D \left( \frac{R}{2} - \frac{R_{TB}}{R_{CA} + R_{TB}} \right) \qquad \text{Eqn. 3}$$

This alternate embodiment, however, lacks the sensitivity afforded by that shown in FIG. 4A. The embodiment of FIG. 5A, nonetheless, offers the advantage of being simpler and less costly to manufacture, and therefore under the right circumstances may be preferable over the embodiment of FIG. 4A.

Figure 6A:
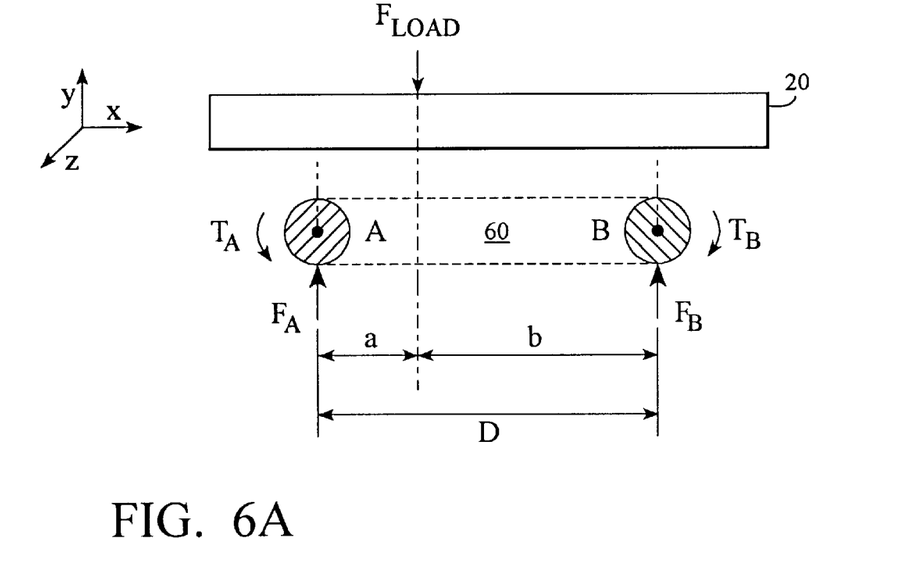
FIGS. 6A–6B, 7A–7B illustrate the underlying concepts of the present invention.
Figure 6B:
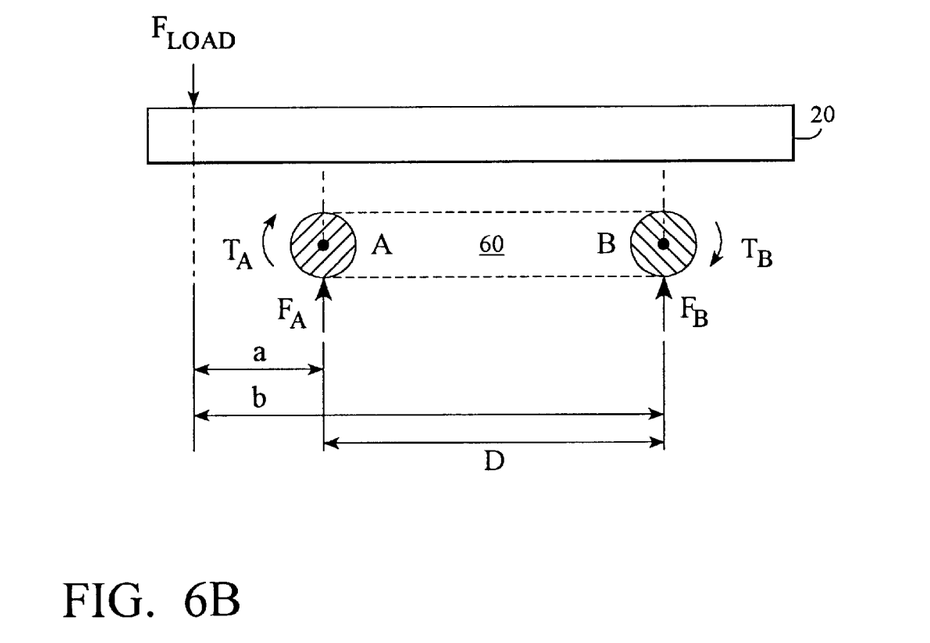

The description will now turn to a discussion of the forces involved in the load cell of the present invention with reference to the free body diagrams of FIGS. 6A and 6B. The cross sectional views shown in the figures are taken at points A and B, the locations on the central load sensing body 60 where the transducers 202, 204 are mounted. See FIGS. 1–3. Consider a load $F_{load}$ applied to the loading surface 20. Under static conditions, the load $F_{load}$ is counteracted by reactive forces at points A and B. These torsional and shear forces may be determined by analyzing equilibrium at these points respectively.

$$\sum F_A = O \qquad \text{Eqn. 4}$$
$$F_A - F_{load} = O$$
$$F_A = F_{load}$$
$$\sum T_A = O$$
$$T_A - F_{load} * a = O$$
$$T_A = F_{load} * a$$

Similarly, the total shear and torsional stresses at point B are:

$$\sum F_B = O \qquad \text{Eqn. 5}$$
$$F_B - F_{load} = O$$
$$F_B = F_{load}$$
$$\sum T_B = O$$
$$T_B - F_{load} * b = O$$
$$T_B = F_{load} * b$$

The gages are placed to measure the total reactive torsional force:

$$\begin{aligned} T_{total} &= \sum T_A + \sum T_B \qquad \text{Eqn. 6}\\ &= T_A + T_B \\ &= F*a + F*b \\ &= F*(a+b) \\ &= F*D \end{aligned}$$

It can be seen that the sum of the torsional reactions at A and B, $T_{total}$ is directly proportional to the loading force $F_{load}$ where the constant of proportionality is D, the distance between the two points A and B. This relation holds true even if the load is applied outside of points A and B, such as in the loading situation of FIG. 6B, which can be shown by a similar analytical treatment of the force vectors. Thus, a given load applied anywhere (i.e. off-axis loading) upon the load bearing surfaces will yield the same $\tau_{reaction}$. This is a substantial improvement over prior art systems which cope with off-axis loads using more expensive designs. The present invention has the double advantage of being extremely simply in design (and therefore is a low-cost item to manufacture) and is insensitive to the position of an applied load.

To complete the discussion, it is noted that in addition to the total reactive torsional stress there is a total reactive shear stress which is simply the sum of the shear forces at points A and B, namely $2 * F_{load}$.

Figures 7A, 7B:
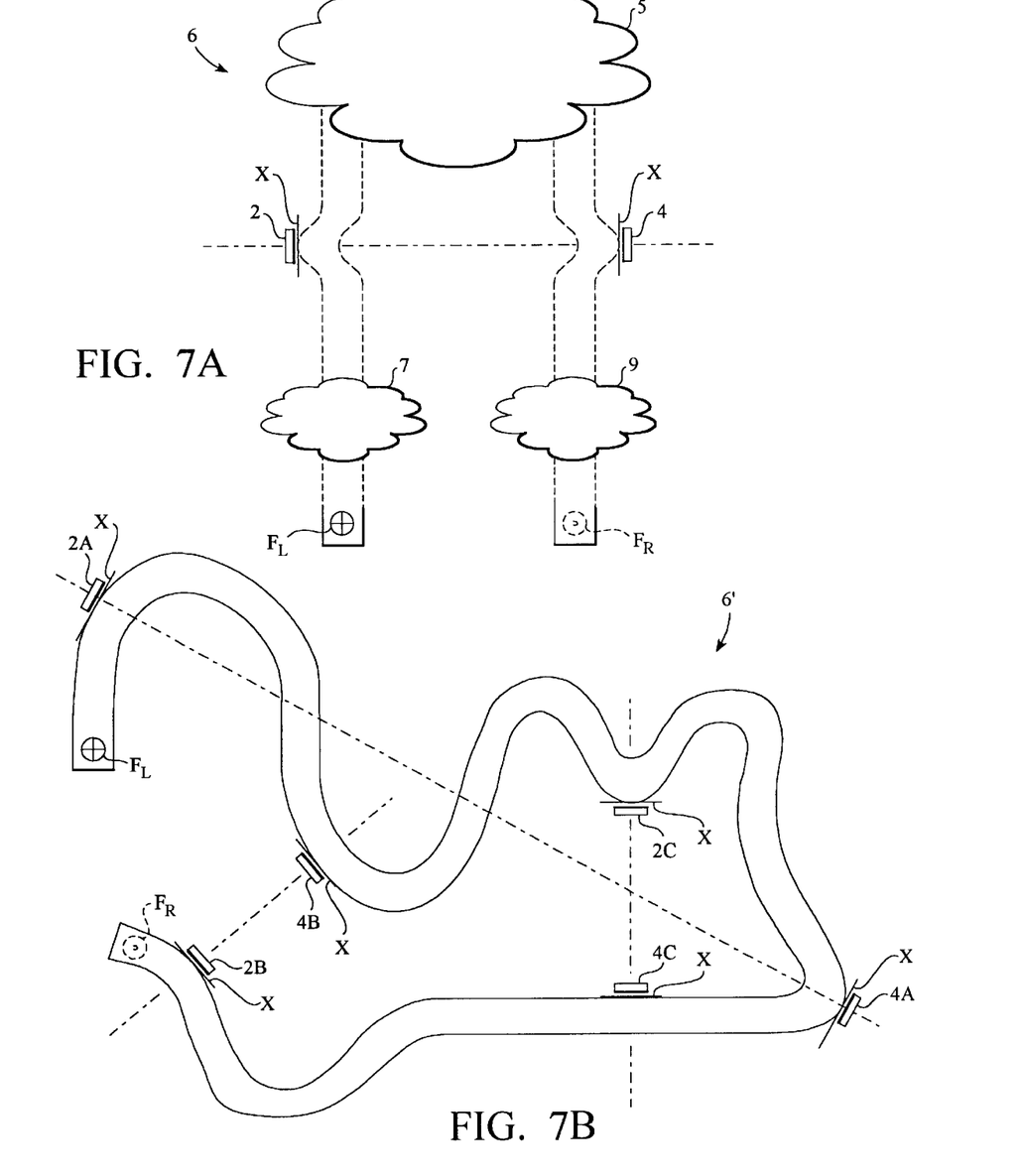

An aspect of the present invention is that the actual shape of the load sensing member (e.g. central body 60, FIGS. 1 and 2) is unimportant. This is shown in FIG. 7A, showing a generalized form of a load sensing member 6. Arbitrary portions 5, 7, and 9 emphasize the notion that sensing member 6 can take on any shape. An example is illustrated by the arbitrarily shaped sensing member 6' of FIG. 7B. A loading force $F_L$ is shown bearing downwardly into the plane of the drawing sheet upon an upper force-receiving section of the sensing member 6', and a counteracting reactive force $F_R$ is shown bearing upwardly upon a bottom force-receiving surface. The resulting action of the two forces is a torque which is transmitted through the body of sensing member 6', and which is detected by transducers 2, 4.

Returning to FIG. 7A, a requirement of the present invention is that the transducers be arranged upon load sensing member 6 such that Equations 4–6 are satisfied. This can be accomplished by mounting the transducers on load member 6 wherein a tangent to the member at the location of each transducer is perpendicular to the line drawn between the transducers. Thus in FIG. 7A, tangent lines X indicate the locations on sensing member 6 where transducers 2, 4 are positioned in accordance with the requirements set forth in Equations 4–6. Thus, transducers arranged in diametrically opposed fashion, such as shown in FIGS. 3, 9A–9F, and 10, satisfy the requirements of Equations 4–6. In addition to the side-mounted arrangement shown in FIG. 7A, the transducers may be mounted to the upper surface of sensing member 6 or to its bottom surface and still satisfy Equations 4–6. Depending on the situation, such alternative mounting arrangements may be desirable over the side mounting configuration.

With reference to FIG. 7B, several locations A, B, C have been identified that would be suitable for mounting transducers, each of the locations indicating the required tangent lines X. The distance between the neutral axes of the sensing member at the point of application of the transducers is referred to as the "effective diameter" of the sensing member. As can be seen in Eqn. 6, sensitivity is increased as the effective diameter D increases. Thus, in FIG. 7B a more sensitive load cell is achieved by placing the transducers at location A than at either of locations B or C.

The transducers are preferably mounted to the surface of the load sensing member, rather than to a web structure formed in the member. This affords maximum sensitivity to torsional stresses since torsion at the surface is at its greatest. It is noted, however, that placement of transducers within web structures may be convenient for a given situation, so long as the web is not so deep as to lie along a neutral axis where the torsion becomes zero.

Figure 8:
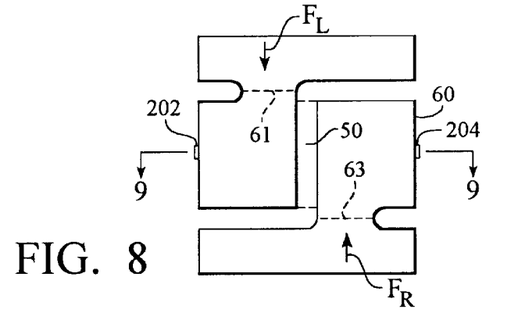
FIG. 8 is a plan view of a load cell of the present invention.
Figure 9A:
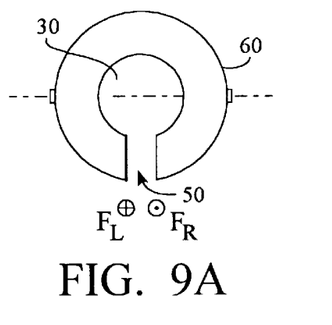
Figure 9B:
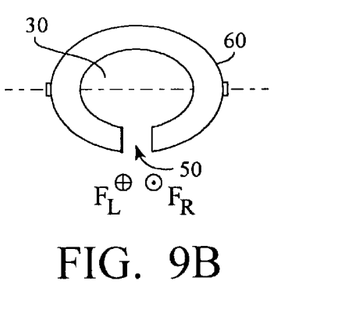
Figure 9C:
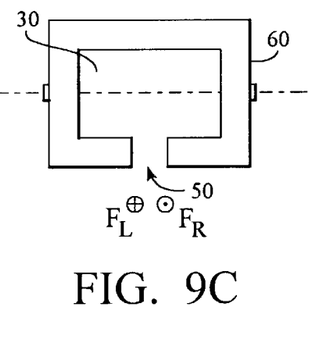
Figure 9D:
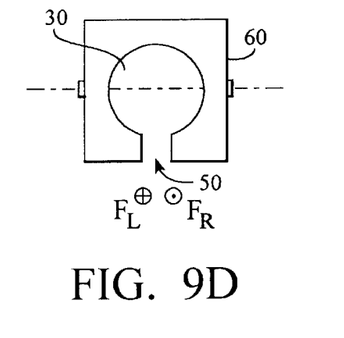

The arbitrarily shaped sensing member 6' shown in FIG. 7B was used to illustrate that its actual shape is unimportant. In practice, however, such a structure is impractical. The load cell shown in profile in FIG. 8 and its variations shown in FIGS. 9A–9F illustrate more realistic embodiments. FIGS. 9A–9F show various top-view profiles of the load sensing member 60 taken from view line 9–9 in FIG. 8. The transducers 202, 204 are shown arranged in diametrically opposed fashion. FIGS. 9A–9C show typical profiles for the sensing member. However, as shown in the profiles of FIGS. 9D–9F, the outer and inner perimeters of the sensing member need not be similarly shaped.

Figure 10A:
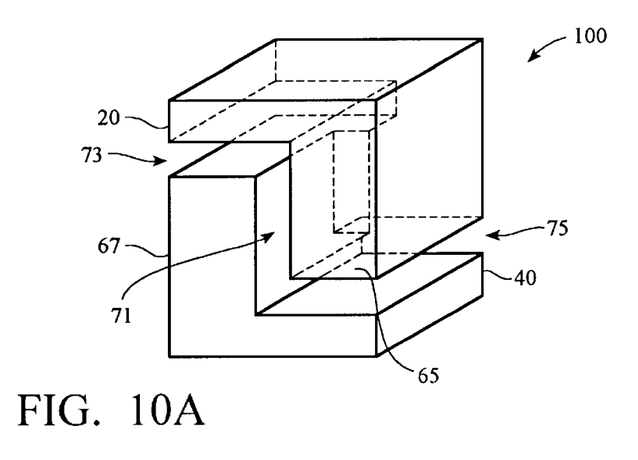
FIGS. 10A–10B show an alternate configuration of the load sensing member.
Figure 10B:
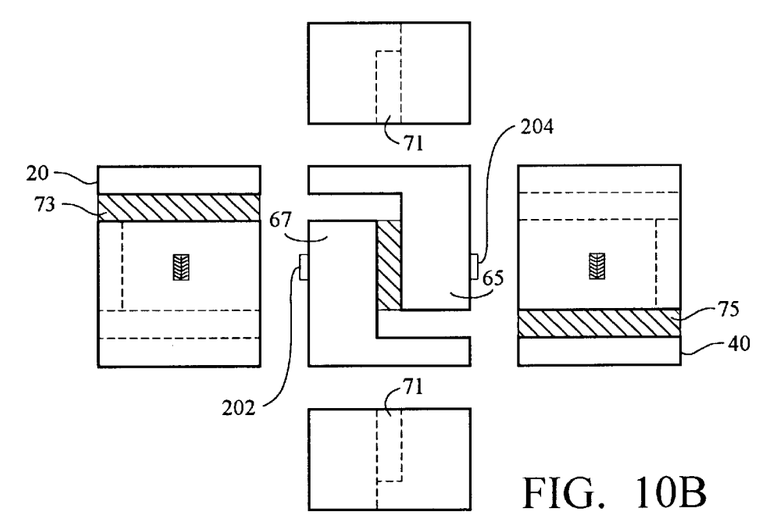

FIGS. 10A and 10B show a load cell 100 comprising a solid block of material formed by a series of slotted cutouts. A central vertical slot 71 defines the deflecting arms 65, 67 of the load sensing portion. Upper and lower horizontal slots 73, 75, which are formed perpendicularly relative to vertical slot 71, respectively define the upper and lower load bearing members 20, 40. Torsional sensing strain gage transducers 202, 204 are affixed to the sensing member. Note that the through hole 30 has been reduced to the intermember space formed by extending gap 71 through the center of the part to create an effective diameter. The result is a maximum cross sectional-size torsional sensing load cell with a minimum effective diameter. This structure results in a very high capacity load cell; for example, a 10,000 lb. load capacity can be achieved in a cube-shaped load cell that is 1.5 inches wide and 1.3 inches tall. Mounting holes can be drilled and tapped in upper and lower load bearing members 20, 40 for mounting. Conversely, low capacity load cells, such as the one shown in FIG. 3, can be constructed with a large effective diameter to provide the higher sensitivities generally required in low load capacity applications. Although not shown, it is clear that the present invention includes other solid shapes (e.g. solid cylinder, sphere, prism, etc.) having similarly slotted cutouts and is not limited to the cubical embodiment shown in FIG. 10A.

Figure 11A:
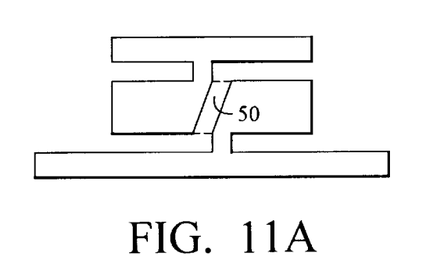
FIGS. 11A–11B illustrate alternate gap profiles for the load sensing member.
Figure 11B:
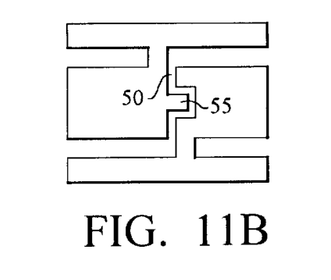

FIGS. 11A and 11B show that the gap 50 need not be a vertical gap as shown in the earlier embodiments. The embodiment of FIG. 11B, for example, shows a gap that includes a notched portion 55 which serves as a stop to prevent the load cell from being deflected beyond its yield point under loading conditions which exceed the rated capacity of the load cell.

Referring again to FIGS. 1 and 2, typical dimensions for a load cell in accordance with the present invention will now be discussed. In practice, the gap width $D_1$ is substantially equal to the height of the slots $D_2$, $D_3$ which separate the load bearing members 20, 40 from the load sensing member 60. This is the result of the preferred mode of manufacture wherein the slots of the load bearing members 20, 40 are formed with the same tool used to form the gap 50. Through hole 30 has a dimension $D_4$ that is defined by the size of the mounting bolt used to mount the load cell. The thickness $D_5$ of the load sensing member 60 is generally defined by the desired size of the through hole 30 and the outside dimension of the load cell itself. The height $D_6$ of the load sensing member 60 is generally dictated by the desired loading capacity of the load cell; a greater height provides an increased load capacity. Following are typical dimensions of load cells manufactured in accordance with the present invention.

A 3000 lb. capacity load cell is constructed with a 3/16" gap width $D_1$ and loading members 20, 40 which are separated from load sensing member 60 by a distance $D_2$, $D_3$ of 3/16". Such a load cell is mounted with a 3/4 bolt with a 0.80" diameter $D_4$ through hole 30. The thickness $D_5$ and height $D_6$ of the load sensing member are 0.5".

As another example, a 6000 LB rated load cell has a 3/16" gap width $D_1$ with loading members 20, 40 which are separated from load sensing member 60 by a distance $D_2$, $D_3$ of 3/16". A 0.921" diameter $D_4$ through hole 30 permits mounting of the load cell with a 7/8" bolt. The thickness $D_5$ and height $D_6$ of the load sensing member are 0.66".

As a final example, an 18,000 lb. load cell has a 1/4" gap width $D_1$ with similarly spaced $D_2$, $D_3$ load bearing members. A 1" diameter $D_4$ through hole provides mounting with a 1 1/32" bolt. The load sensing member 60 has a thickness $D_5$ and height $D_6$ of 1".

I claim:

1. A load cell comprising:
   a load sensing member having first and second ends;
   first means for receiving an applied load and for directing the force of the applied load to a first portion of the sensing member;
   second means for receiving a reactive force opposing the force of the applied load and for directing the reactive force a second portion of the sensing member, the first and second means located so that the force of the applied load in combination with the reactive force torsionally stress the sensing member; and
   first and second transducers mounted on the sensing member between the first and second portions;
   the transducers responsive to torsional stresses and coupled to form a bridge circuit for producing output signals in response to the torsional stresses;
   the transducers positioned such that the combined output of the transducers for a given applied load is proportional to the product of the distance between the transducers and a force component of the applied load that is perpendicular to a plane passing through the sensing member at portions where the transducers are mounted.

2. The load cell of claim 1 wherein the transducers further are positioned so that a tangent to the sensing member at each transducer is perpendicular to a line between the transducers.

3. The load cell of claim 1 wherein the transducers are surface-mounted.

4. The load cell of claim 1 wherein the first means is an upper loading platform spaced apart from and coupled to the sensing member at the first portion, and the second means is a lower loading platform spaced apart from and coupled to the sensing member at the second portion.

5. The load cell of claim 4 wherein the loading platforms are solid members.

6. The load cell of claim 4 wherein the loading platforms each have an opening therethrough.

7. The load cell of claim 1 wherein the sensing member is an annular member having a gap formed therethrough to define the first and second ends, the first and second transducers being mounted on diametrically opposite sides of the annular member.

8. The load cell of claim 7 wherein the transducers are located on diametrically opposed sides along the outside diameter of the annular member.

9. The load cell of claim 1 wherein the sensing member is a solid member having a slot formed thereinto, the slot extending the full extent of the solid member along a longitudinal axis thereof, the ends being portions of the solid member on each side of the slot.

10. The load cell of claim 9 wherein the solid member is rectangularly shaped and the transducers are mounted on opposing outside surfaces of the solid member.

11. The load cell of claim 9 wherein the solid member is cylindrical and the transducers are mounted on diametrically opposing locations upon the exterior surface of the cylindrical solid member.

12. A torsional sensing load cell comprising:
   a load-sensing member having upper and lower surfaces, the load sensing member having a gap extending between the upper and lower surfaces and through a width of the body thereof, the load sensing member having first and second force-bearing sections located thereon;
   means for suspending the load sensing member at the force-bearing sections so that a loading force and a reactive force are directed only to the force-bearing sections, the force-bearing sections positioned so as to subject the load sensing member to a torsional stress; and
   first and second transducers mounted to first and second portions of the load sensing member between the force-bearing sections, the first and second portions containing a plane passing therethrough, the loading force having a force component perpendicular to the plane;

the transducers positioned such that the sum of the torsional stress experienced by the first transducer and the torsional stress experienced by the second transducer is proportional to the distance between the transducers times the magnitude of the perpendicular force component;

whereby the transducers produce signals in response to the torsional stress which can be combined to produce a signal that is independent of the location of the loading and reactive forces.

13. The load cell of claim 12 wherein the transducers are mounted so that a tangent to the load sensing member at each transducer is perpendicular to a line therebetween.

14. The load cell of claim 12 wherein the transducers each includes two sets of strain gage elements arranged in a chevron pattern, the strain gage elements being electrically coupled in a bridge circuit arrangement.

15. The load cell of claim 12 wherein the transducers each includes one set of strain gage elements coupled in a voltage divider circuit.

16. The load cell of claim 12 wherein the transducers are surface mounted.

17. The load cell of claim 12 wherein the load sensing member is an annular member, and the transducers are mounted at diametrically opposed positions along either the outer perimeter of the annular member or the inner perimeter of the annular member.

18. The load cell of claim 12 wherein the load sensing member is a rectangularly shaped member and the transducers are mounted on opposing sides upon the exterior surface of the rectangularly shaped member.

19. The load cell of claim 18 wherein the rectangularly shaped member has a cylindrically shaped interior.

20. A torsional sensing load cell comprising:

a central body having a slotted opening thereinto, the slotted opening defining a first deflectable member and a second deflectable member, each deflectable member having a force-receiving portion;

first and second transducers respectively mounted to first and second areas of the central body; and upper and lower load bearing members, each spaced apart from the central body and coupled thereto at the force-receiving portions of the deflectable members so that the force of an applied load and the corresponding reactive force are directed only to the force-receiving portions of the central body;

the transducers mounted so that a tangent to the central body at each transducer is perpendicular to a line between the transducers;

the transducers being coupled in a Wheatstone bridge arrangement to produce an output signal which is independent of the location of the applied load.

21. The load cell of claim 20 wherein the transducers are mounted upon the surface of the central body.

22. The load cell of claim 20 wherein the central body is an annular-shaped member.

23. The load cell of claim 22 wherein the transducers are mounted on the exterior surface of the annular member in a diametrically opposed manner.

24. The load cell of claim 22 wherein the transducers are mounted on the interior surface of the annular member in a diametrically opposed manner.

25. The load cell of claim 20 wherein the central body is generally rectilinear and the transducers are mounted to the surface thereof.

26. The load cell of claim 25 wherein the central body is substantially a solid member.

27. The load cell of claim 25 wherein the central body is hollow.

28. The load cell of claim 27 wherein the hollow portion defines a cylindrical shape.

29. In a load sensing member that is split to form two ends, a method of measuring a load comprising the steps of:

selecting first and second force receiving locations on the load sensing member;

applying the force of a load to the first force receiving location;

applying an opposing reactive force to the second force receiving location, the first and second force receiving locations being selected so that the applied forces produce a torsional stress through the load sensing member;

selecting first and second measuring locations between the first and second force receiving locations so that the torsional stress at the first measuring location summed with the torsional stress at the second measuring location is proportional to the distance between the two measuring locations times a force component of the load which is perpendicular to a plane passing through both measuring locations;

measuring the torsional stress at the first and second measuring locations; and combining the measured torsional stresses to determine the load.

30. The method of claim 29 wherein the first and second force receiving locations are in opposed relation so that the forces applied thereto are oppositely directed.

31. The method of claim 30 wherein the first force receiving location is located on a first of the two ends of the load sensing member and the second force receiving location is located on a second of the two ends of the load sensing member.

32. A load cell comprising:

a load sensing member having first and second deflecting arms, the first deflecting arm having a first portion thereof to which a loading force is applied, the second deflecting arm having a second portion thereof to which a reactive force is applied, the first and second portions positioned so that the applied force in combination with the reactive force torsionally stress the load sensing member; and first and second transducers mounted to the load sensing member and positioned so as to be respectively subjected to first and second torsional stresses, the sum of the first and second torsional stresses being proportional to the magnitude of a perpendicular force multiplied by the distance between the transducers, the perpendicular force being a component of the applied force that is perpendicular to a plane passing through portions of the load sensing member at locations where the transducers are mounted.

33. The load cell of claim 32 wherein the transducers are positioned so that lines tangent to the sensing member at each transducer are perpendicular to a line between the transducers.

34. The load cell of claim 32 wherein the transducers are surface mounted.

35. The load cell of claim 32 further including an upper loading platform spaced apart and coupled to the load sensing member at the first portion of the first deflecting arm, and a lower loading platform spaced apart and coupled to the load sensing member at the second portion of the second deflecting arm.

36. The load cell of claim 32 wherein the load sensing member is an annular member having a gap formed therethrough to define the first and second deflecting arms, the first and second transducers being mounted on diametrically opposed sides of the annular member.

37. The load cell of claim 36 wherein the transducers are located along the outside diameter of the annular member.

38. The load cell of claim 32 wherein the sensing member is a solid member having a slot formed thereinto, the slot extending the full extent of the solid member along a longitudinal axis thereof, the deflecting arms being portions of the solid member on each side of the slot.

39. The load cell of claim 32 wherein the load sensing member is rectangularly shaped and the transducers are mounted on opposing outside surfaces thereof.

40. The load cell of claim 38 wherein the solid member is cylindrical and the transducers are mounted on diametrically opposed locations on the exterior surface of the solid member.

* * * * *